United States Patent
Yoshida et al.

(10) Patent No.: US 7,668,076 B2
(45) Date of Patent: Feb. 23, 2010

(54) MULTI-USER RECEIVING APPARATUS CONVERTING SC-FDMA RECEIVED SIGNALS OF ALL USERS TO SIGNALS IN A FREQUENCY DOMAIN COMMONLY

(75) Inventors: Shousei Yoshida, Tokyo (JP); Masayuki Kimata, Tokyo (JP); Yoshikazu Kakura, Tokyo (JP); Kengo Oketani, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 11/524,941

(22) Filed: Sep. 22, 2006

(65) Prior Publication Data
US 2007/0070879 A1    Mar. 29, 2007

(30) Foreign Application Priority Data
Sep. 27, 2005  (JP)  ............................. 2005-280091

(51) Int. Cl.
*H04J 11/00* (2006.01)
(52) U.S. Cl. ...................... 370/208; 370/204; 375/260
(58) Field of Classification Search ................. 370/203, 370/208, 310, 328, 329, 315, 316, 319, 343, 370/344; 375/259, 260, 261, 265
See application file for complete search history.

(56) References Cited

U.S. PATENT DOCUMENTS

| | | | |
|---|---|---|---|
| 5,734,647 A | 3/1998 | Yoshida et al. | |
| 6,937,558 B2 | 8/2005 | Wakutsu | |
| 2002/0150038 A1* | 10/2002 | Sumasu et al. | 370/208 |
| 2006/0215603 A1* | 9/2006 | Nishio et al. | 370/329 |
| 2008/0008206 A1* | 1/2008 | Cho et al. | 370/430 |

FOREIGN PATENT DOCUMENTS

| | | |
|---|---|---|
| EP | 1 612 879 A1 | 1/2006 |
| EP | 1 679 813 A1 | 7/2006 |
| JP | 08-163087 | 6/1996 |
| JP | 2001-320346 A | 11/2001 |
| JP | 2002-094479 A | 3/2002 |
| JP | 2004-312291 A | 11/2004 |
| JP | 2005-117581 A | 4/2005 |
| WO | WO 2005/022810 A2 | 3/2005 |

OTHER PUBLICATIONS

D. Falconer et al., "Frequency Domain Equalization for Single-Carrier Broadband Wireless Systems," IEEE Communications Magazine, Apr. 2002, pp. 58-66.

* cited by examiner

*Primary Examiner*—Chi H Pham
*Assistant Examiner*—Weibin Huang
(74) *Attorney, Agent, or Firm*—Foley & Lardner LLP

(57) ABSTRACT

A multi-user receiving apparatus is provided for achieving a reduction in the amount of processing for single-carrier FDMA signals and an improvement in reception characteristics. A DFT unit converts single-carrier FDMA received signals of all users to signals in a frequency domain commonly. A demapping unit selects part of sub-carriers for each user from sub-carriers supplied from the DFT unit. A reception filter separates a user signal and suppresses noise. A demodulator demodulates the user signal, and detects a timing thereof.

8 Claims, 8 Drawing Sheets

MULTI-USER RECEIVING APPARATUS CONVERTING SC-FDMA RECEIVED SIGNALS OF ALL USERS TO SIGNALS IN A FREQUENCY DOMAIN COMMONLY

BACKGROUND OF THE INVENTION

1. Field of the Invention

The present invention relates to a multi-user receiving apparatus for use in a base station with which a plurality of mobile stations each assigned to a respective use simultaneously communicate in accordance with a single-carrier frequency division multiple access scheme.

2. Description of the Related Art

In an uplink radio system for next-generation mobile communication packet access, importance is attached to a high transmission power efficiency of terminals, and radio transmissions free of interference between users who simultaneously make accesses, in order to expand communication areas. As a radio scheme that satisfies these requirements, a frequency division multiple access (FDMA) scheme which employs a single carrier (SC) having a low peak to average power ratio (PAPR), has been under consideration. The SC-FDMA scheme divides a frequency band of a system into sub-bands, each of which is utilized by multiple users. Each user performs a single carrier transmission having a band that is variable in accordance with a required transmission rate. A feature of the SC-FDMA scheme is that each of the user signals is not subjected to interference because of their different carrier frequencies, and the scheme is therefore suitable for packet transmissions which are difficult to apply a highly accurate transmission power control, as compared with a code division multiple access (CDMA) and the like. FIG. 1 shows a frequency spectrum of a SC-FDMA signal when three users U1, U2, U3, for example, make simultaneous accesses.

FIG. 3 illustrates a block diagram of a conventional, typical receiving apparatus for SC-FDMA signals. The conventional SC-FDMA signal receiving apparatus comprises K (where K is an integer not less than one) user receivers 101-k (where 1≦k≦K), each being associated with respective users. Each user receiver 101-k converts the frequency of an SC-FDMA received signal, and filters and demodulates the frequency-converted SC-FDMA signal. Each user receiver 101-k is comprised of frequency converter 102, reception filter 103, and demodulator 104. Frequency converter 102 is supplied with a SC-FDMA received signal, and converts the carrier of each user signal to a zero frequency. Reception filter 103 limits the band of each user signal to separate the user signal and suppress noise. As reception filter 103, a raised cosine roll-off filter is typically used. Demodulator 104 performs such processing as timing detection, transmission channel estimation and equalization, and outputs a demodulated signal. A variety of methods may be employed to demodulate a single-carrier signal. For example, consideration is given to using a frequency domain equalizer which can significantly reduce the amount of processing, by performing multi-path equalization through frequency-domain signal processing (D. Falconer, S. L. Ariyavisitakul, A. Benyamin-Seeyar, and B. Didson, "Frequency Domain Equalization for Single-Carrier Broadband Wireless Systems," IEEE Comun. Mag., vol. 40, no. 4, pp. 58-66, April 2002.).

FIG. 2 shows an exemplary format for a packet signal when a frequency domain equalizer is used. The packet signal is made up of a plurality of blocks, each of which contains a pilot or data. In the illustrated example, the first block contains a pilot signal, followed by a plurality of sequential blocks each containing a data signal. A guard interval (GI) is provided at the beginning of each block in order to avoid multi-path interference from a previous block during DFT (Discrete Fourier Transform) processing. As the GI, a cyclic prefix is typically used which adds the last data in each block to the top thereof.

Demodulator 104 comprises delay profile generator 105, timing detector 106, transmission channel estimator 107, serial/parallel (S/P) converter 108, DFT unit 109, weight calculation unit 110, guard interval (GI) remover 111, S/P converter 112, DFT unit 113, equalizing filter 114, inverse discrete Fourier transform (IDFT) unit 115, and parallel/serial (P/S) converter 116. Delay profile generator 105 receives a signal, the band of which has been limited by reception filter 103, and generates a delay profile based on a detected sliding correlation of a pilot signal multiplexed on the received signal to a known pilot code. Timing detector 106 receives the delay profile generated by delay profile generator 105, and detects timings of a plurality of paths, at higher levels, including a timing of the first path. The timing of the first path is used for controlling a DFT timing, and the timing of other paths is used for estimating each transmission channel. Transmission channel estimator 107 is supplied with the received signal, the band of which has been limited by reception filter 103, and with path timings detected by timing detector 106. Transmission channel estimator 107 then estimates a transmission channel estimate for each path using a pilot signal included in the received signal S/P converter 108 performs a serial to parallel conversion of a transmission channel response sequence that is an alignment of the transmission channel estimates for respective paths on a time axis. DFT unit 109 receives the transmission channel response sequence converted by S/P converter 108, and outputs a transmission channel estimate converted into a frequency domain. Weight calculation unit 110 receives the transmission channel estimate output from DFT unit 109, and calculates weight for an equalizing filter in accordance with a minimum mean square error (MMSE) method, a zero forcing method or the like. GI remover 111 is supplied with the received signal, the band of which has been limited by reception filter 103, and with the DFT timings detected by timing detector 016, and GI remover 111 removes a portion of the received signal corresponding to GI. S/P converter 112 performs a serial to parallel conversion of the received signal, from which the GI has been removed by GI remover 111. DFT unit 113 receives the received signal converted by S/P converter 112, and converts the received signal into a frequency domain. Equalizing filter 114 receives the received signal, which has been converted into the frequency domain, and the equalization weight calculated by weight calculation unit 110, and multiplies the received signal by the equalization weight for each sub-carrier to equalize the received signal. IDFT unit 115 receives the equalized signal in the frequency domain output from equalizing filter 114, and performs IDFT on the equalized signal for conversion into a time domain. P/S converter 116 performs a parallel to serial conversion of the equalized signal converted into the time domain to generate a demodulated signal.

The conventional SC-FDMA signal receiving apparatus shown in FIG. 3 is problematic in that processing in frequency converter 102 and processing in reception filter 103 which is required to accomplish a variable bandwidth are made complicated by the increase of users. Additionally, the method of performing timing detection and transmission channel estimation using a detected correlation with pilot codes in the time domain is problematic in that it requires a large amount of processing, and the reception characteristics are degraded due to the influence of multi-path interference.

SUMMARY OF THE INVENTION

It is an object of the present invention to provide a multi-user receiving method and apparatus which are intended to reduce the amount of processing and to improve reception characteristics.

According to one aspect of the present invention, there is provided a multi-user receiving method which includes converting SC-FDMA received signals of all users to signals in a frequency domain commonly; selecting part of the sub-carriers for each user contained in the signals in a frequency domain; and performing reception processing.

According to another aspect of the present invention, there is provided a multi-user receiving apparatus which includes n DFT unit for converting SC-FDMA received signals of all users to signals in a frequency domain commonly; a demapping unit for selecting part of the sub-carriers for each user contained in the signals in a frequency domain supplied from said DFT unit; and a plurality of user receivers each associated with one of a plurality of users, and each including a reception filter for limiting the frequency band of each user signal supplied from said demapping unit, to separate the user signal and to suppress noise, and a demodulator for demodulating the output of said reception filter and for detecting a reception timing to generate a timing control signal.

The SC-FDMA received signals of all users are discrete Fourier transformed commonly, and all demodulation processing is performed through signal processing in the frequency domain after the received signals have been separated on a user-by-user basis, thereby achieving a reduction in the amount of processing for single-carrier FDMA signals and an improvement in reception characteristics.

The SC-FDMA received signals of all users are discrete Fourier transformed commonly, and demapping (frequency conversion), variable bandwidth filtering of received signals, and transmission channel estimation are all performed in the frequency domain. Accordingly, an increase in the amount of processing loaded on the receiving apparatus can be kept small even if the number of users is increased, as compared with the conventional receiving apparatus which performs the frequency conversion, filtering of received signals, and correlation detection in the time domain. Furthermore, since the estimation of a transmission channel and the detection of timings for each user, involved in the demodulation, are performed through signal processing in the frequency domain, multi-path interference can be avoided and reception characteristics are improved.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
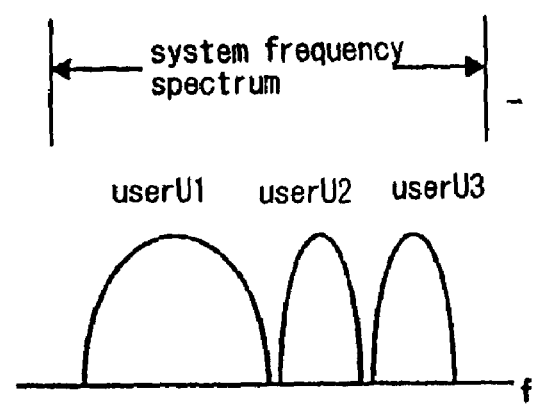
FIG. 1 is a diagram showing a frequency spectrum of a single-carrier FDMA signal.
Figure 2:
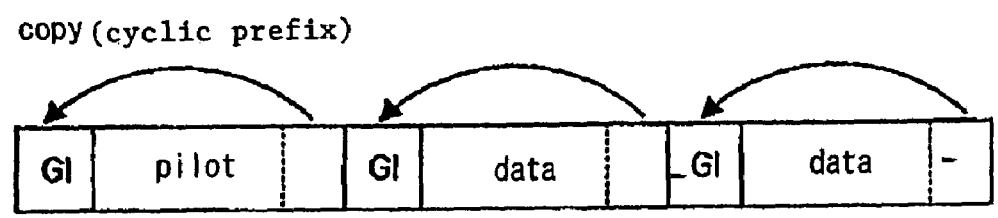
FIG. 2 is a diagram showing a format for a packet signal when a frequency domain equalizer is used.
Figure 3:
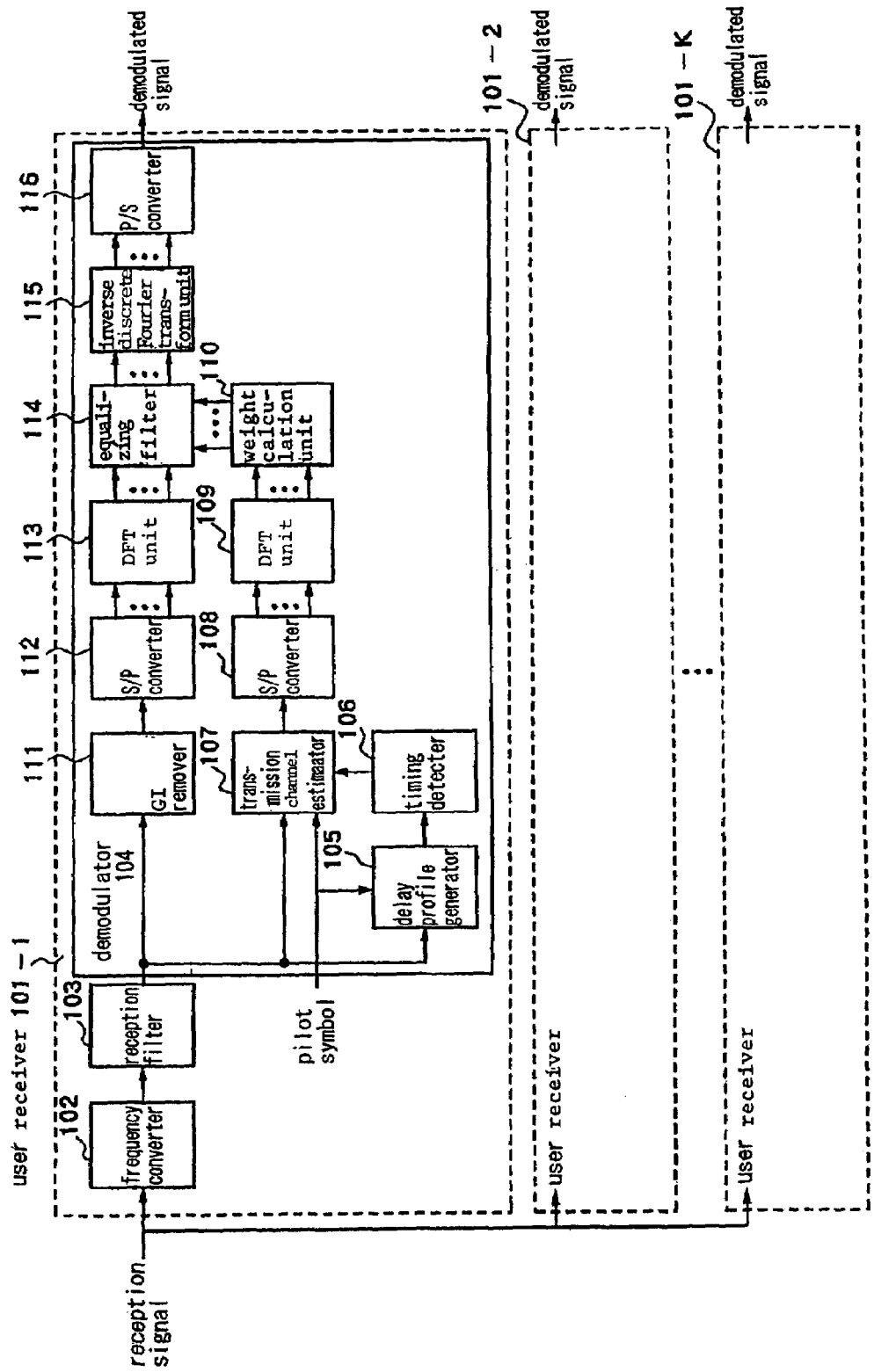
FIG. 3 is a block diagram of a conventional receiving apparatus.
Figure 4:
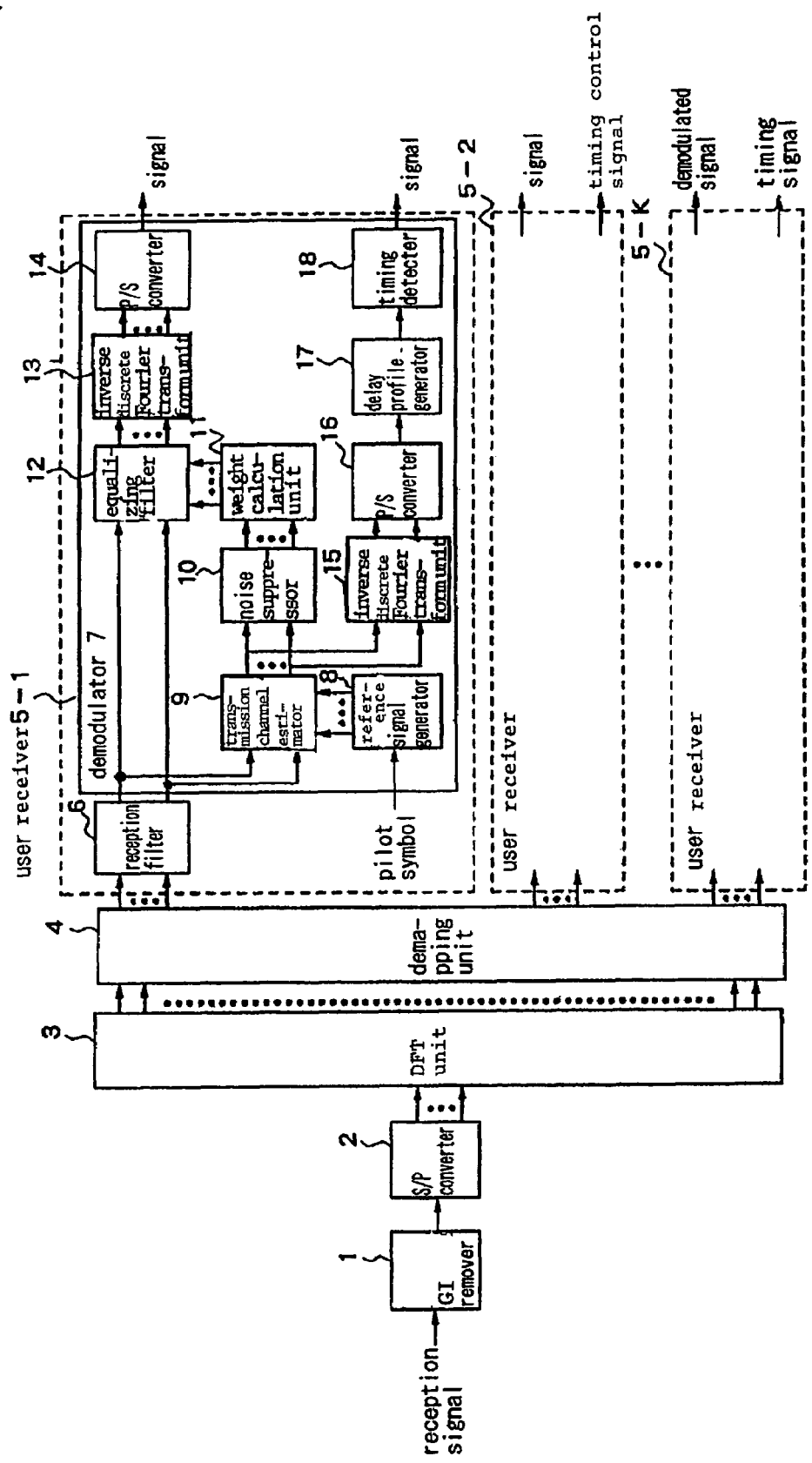
FIG. 4 is a diagram illustrating the configuration of a multi-user receiving apparatus according to an embodiment of the present invention.

Referring now to FIG. 4, a multi-user receiving apparatus for receiving an SC-FDMA signal according to an embodiment of the present invention comprises GI remover 1, S/P converter 2, DFT unit 3, demapping unit 4, and K (where K is an integer equal to or more than two) user receivers 5-k (where $1 \leq k \leq K$), one for each user. A feature of the apparatus is discrete Fourier transforming SC-FDMA received signals of all users commonly and demodulation of the received signals, after they have been separated on a user-by-user basis, through signal processing in a frequency domain.

Figure 5:
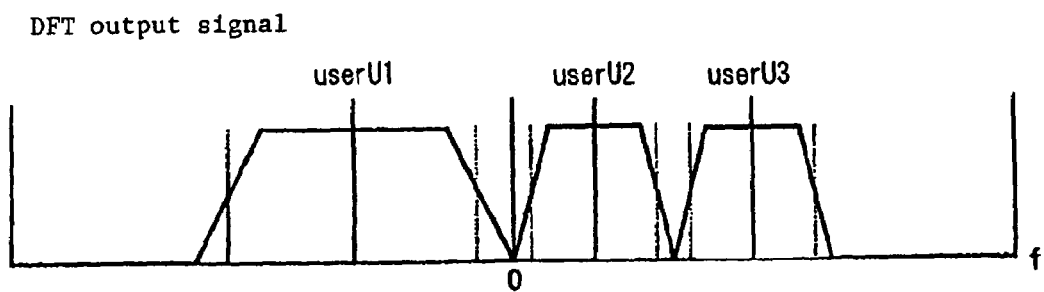
FIG. 5 is a diagram showing an output signal of DFT unit 3.
Figure 6:
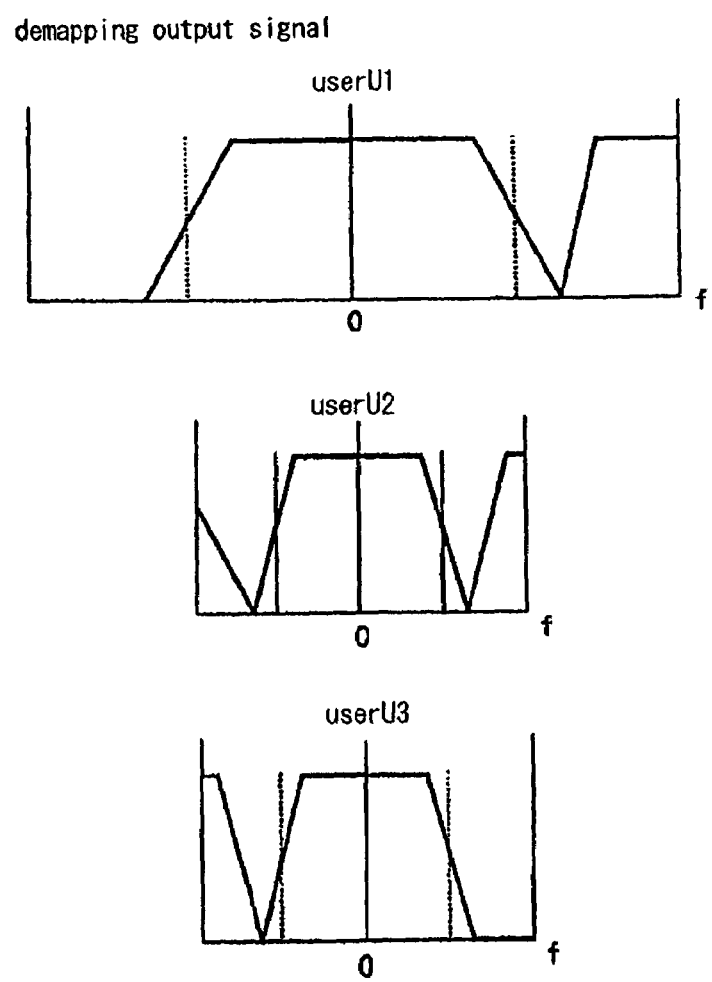
FIG. 6 is a diagram showing output signals of demapping unit 4.
Figure 7:
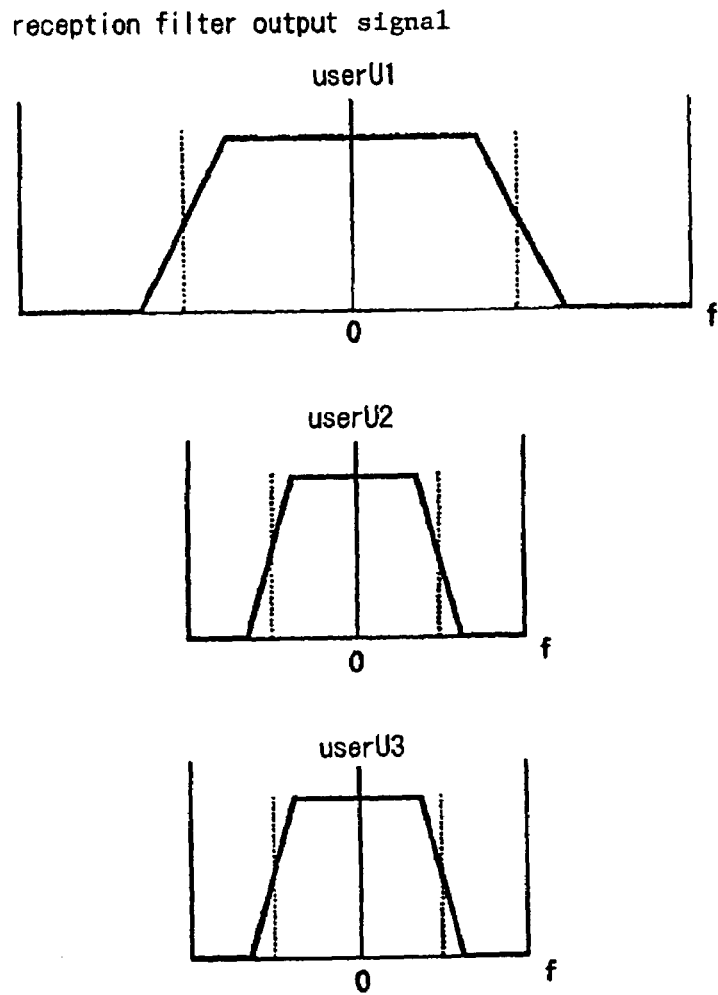
FIG. 7 is a diagram showing output signals of reception filter 6.

GI remover 1 receives an SC-FDMA received signal and a DFT timing, and removes a portion of the received signal corresponding to GI before receipt of the DFT timing. S/P converter 2 performs a serial to parallel conversion of the received signal from which the GI has been removed by GI remover 1. Alternatively, GI remover 1 may be omitted, and S/P converter 2 may perform a serial to parallel conversion of the received signal, which has not passed through GI remover 1. DFT unit 3 is supplied with the received signal which has been converted to a parallel signal by S/P converter 2, and discrete Fourier transforms SC-FDMA signals of all users commonly for conversion into signals in a frequency domain. FIG. 5 shows an exemplary output signal of DFT unit 3. In FIG. 5, FDMA signals of three users are discrete Fourier transformed commonly in a frequency domain wider than the system band. Demapping unit 4 selects part of sub-carriers required for reception processing for each user contained in the signals in a frequency domain supplied from DFT unit 3 to thereby convert the frequency of the carrier of each user to zero frequency for adjustment to a sampling frequency in accordance with a transmission rate. FIG. 6 shows exemplary output signals of demapping unit 4. As shown In FIG. 6, demapping unit 4 demaps the DFT output signal of each user such that the carrier of each user is centered at zero frequency, and such that the sampling frequency is increased twice as high as the transmission rate. Each receiver 5-k (where $1 \leq k \leq K$) is comprised of reception filter 6 and demodulator 7. Reception filter 6 limits the frequency of each user signal within the frequency domain to separate the user signal and suppress noise. FIG. 7 shows an exemplary output signal of reception filter 6. As shown in FIG. 7, interference of other user signals adjacent to each user signal has been removed. As reception filter 6, a raised cosine roll-off filter having a raised cosine roll-off characteristic with a variable bandwidth corresponding to the transmission rate of each user signal, may be used. Demodulator 7 performs such processing as transmission channel estimation, equalization, and timing detection in the frequency domain to generate a demodulated signal. Specifically, demodulator 7 demodulates the output of the reception filter and detects a reception timing to generate a timing control signal.

Figure 8:
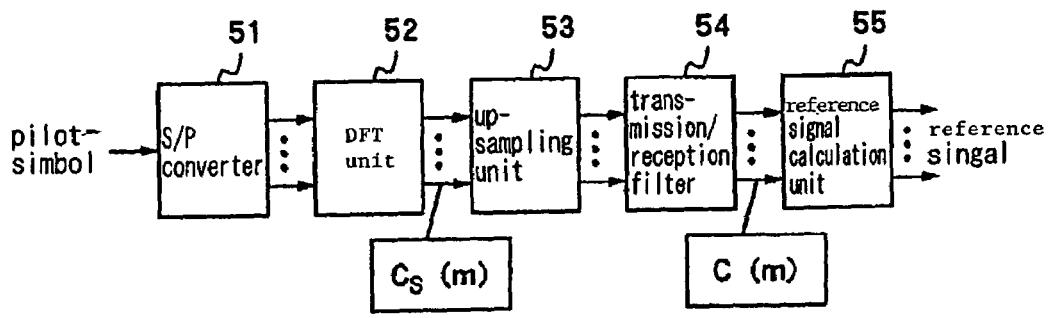
FIG. 8 is a block diagram illustrating the configuration of reference signal generator 8.
Figure 9:
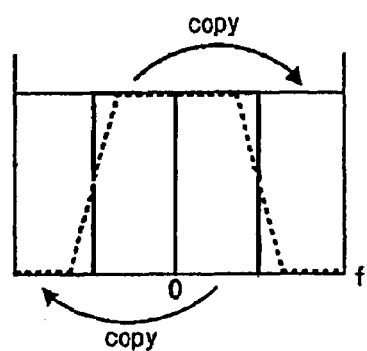
FIG. 9 is a diagram for describing the operation of up-sampling unit 53.

Demodulator 7 is comprised of reference signal generator 8, transmission channel estimator 9, noise suppressor 10, weight calculation unit 11, equalizing filter 12, IDFT unit 13, P/S converter 14, IDFT unit 15, P/S converter 16, delay profile generator 17, and timing detector 18. Reference signal generator 8, transmission channel estimator 9, noise suppressor 10, weight calculation unit 11, equalizing filter 12, IDFT unit 13, and P/S converter 14 perform transmission channel estimation and equalization to generate a demodulated signal. Reference signal generator 8 receives a pilot code and generates a pilot reference signal in a frequency domain of each user from pilot symbols. Specifically, reference signal generator 8 performs DFT on pilot symbols, limits the frequency band of the DFT signal with a transmission/reception filter, and generates a pilot reference signal by which pilot symbol pattern characteristics included in the received pilot signal, together with characteristics of the transmission/reception filter are cancelled in the calculation of a transmission channel estimate. FIG. 8 illustrates the configuration of reference signal generator 8. Reference signal generator 8 is comprised of S/P converter 51, DFT unit 52, up-sampling unit 53, transmission/reception filter 54, and reference signal calculation unit 55. S/P converter 51 performs a serial to parallel conversion of the pilot signal. DFT unit 52 converts the pilot code into a frequency domain at a unit sampling frequency. Up-sampling unit 53 up-samples the output signal of DFT unit 52 (increases the sampling frequency). FIG. 9 is an explanatory view of the operation of up-sampling unit 53. By duplicating a unit sampling signal CS(m) obtained from DFT of the pilot code to a higher frequency domain, a signal at a sampling frequency twice as high as that of the pilot code can be obtained. Up-sampling unit 53 delivers the up-sampled pilot code to transmission/reception filter 54. In FIG. 9, output signal C(m) of transmission/reception filter 54 is indicted by a broken line. C(m) represents a characteristic that results from the multiplication of a code characteristic in the frequency domain by the characteristic of transmission/reception filter 54. In the configuration of FIG. 8, the filtering of the pilot code is performed through signal processing in the frequency domain. However, it may be performed through signal processing in the time domain prior to the processing by DFT unit 52. In the time domain, convolution processing (or an FIR [Finite Impulse Response] filter) is performed. Reference signal calculation unit 55 calculates a reference signal used for transmission channel estimation from output signal C(m) of transmission/reception filter 54. Reference signal X(m) of sub-carrier m is usually calculated by using the following equation:

$$X(m) = \frac{C(m)}{|C(m)|^2} \quad (1)$$

Figure 10:
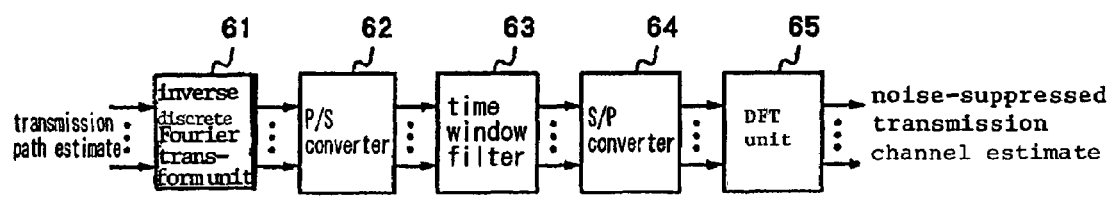
FIG. 10 is a block diagram illustrating the configuration of a noise suppressor 10.

Transmission channel estimator 9 is supplied with the received pilot signal, the frequency band of which has been limited by reception filter 6, and with pilot reference signal X(m) generated by reference signal generator 8, and calculates a transmission channel estimate in the frequency domain. Transmission channel estimate H(m) of sub-carrier m is calculated by using the following equation:

$$H(x) = P_r(m)X^*(m) \quad (2)$$

where suffix * represents a complex conjugate, and Pr(m) a received pilot signal, the band of which has been limited by reception filter 6. When a transmission channel is estimated using the reference signal given by Equation (1), a code characteristic included in the received pilot signal (characteristic of the pilot signal in the frequency domain, resulting from DFT of the pilot code in the time domain) can be canceled, together with the characteristic of the transmission/reception filter. However, if the code characteristic is not constant in the frequency domain, noise is accentuated. This is because, if the pilot code characteristic is not constant (takes an extremely small value), X(m) in Equation (1) becomes extremely large, so that the calculation of Equation (2) causes noise components to be amplified. Therefore, the use of a pilot code having constant characteristics can reduce noise contained in H(m). A sequence which exhibits constant code characteristics in the frequency domain (for example, a Chu sequence), or a code having 1's and −1's generated as randomly as possible may preferably be used as the pilot code. Noise suppressor 10 suppresses noise in the transmission channel estimate provided by transmission channel estimator 9 to thereby improve the ratio of signal power to noise power (S/N). Noise suppressor 10 may employ a method of averaging adjacent sub-carriers, a method of temporarily converting a transmission channel estimate into an estimate in a time domain to remove a noise path by a time window filter, or the like. FIG. 10 illustrates an exemplary configuration of noise suppressor 10. As shown in FIG. 10, noise suppressor 10 is comprised of IDFT unit 61, P/S converter 62, time window filter 63, S/P converter 64, and DFT unit 65. IDFT unit 61 receives a transmission channel estimate in the frequency domain, and converts it an estimate in the time domain. P/S converter 62 performs a parallel to serial conversion of the transmission channel estimate represented in the time domain. Time window filter 63 improves the S/N by passing the transmission channel response sequence converted by P/S converter 62 through the time window filter. For example, if it is assumed that transmission channel responses are within GI, and "1" is multiplied by a transmission channel response in a section corresponding to GI, and "0" is multiplied by a transmission channel response in the other sections, then noise components will be removed. S/P converter 64 performs a serial to parallel conversion of the transmission channel response sequence from which the noise components have been removed by time window filter 63. DFT unit 65 converts the S/P converted transmission channel response sequence into a sequence in the frequency domain to generate a noise-suppressed transmission channel estimate. Weight calculation unit 11 receives the transmission channel estimate output from noise suppressor 10, and calculates a weight for an equalizing filter in accordance with MMSE, a zero forcing method or the like. For example, if MMSE is used, equalization weight W(m) on sub-carrier m is calculated by the following equation:

$$W(m) = \frac{H^*(m)}{|H(m)|^2 + \sigma^2} \quad (3)$$

where $\sigma^2$ represents noise power, and H(m) represents a transmission channel estimate of sub-carrier m.

Figure 11:
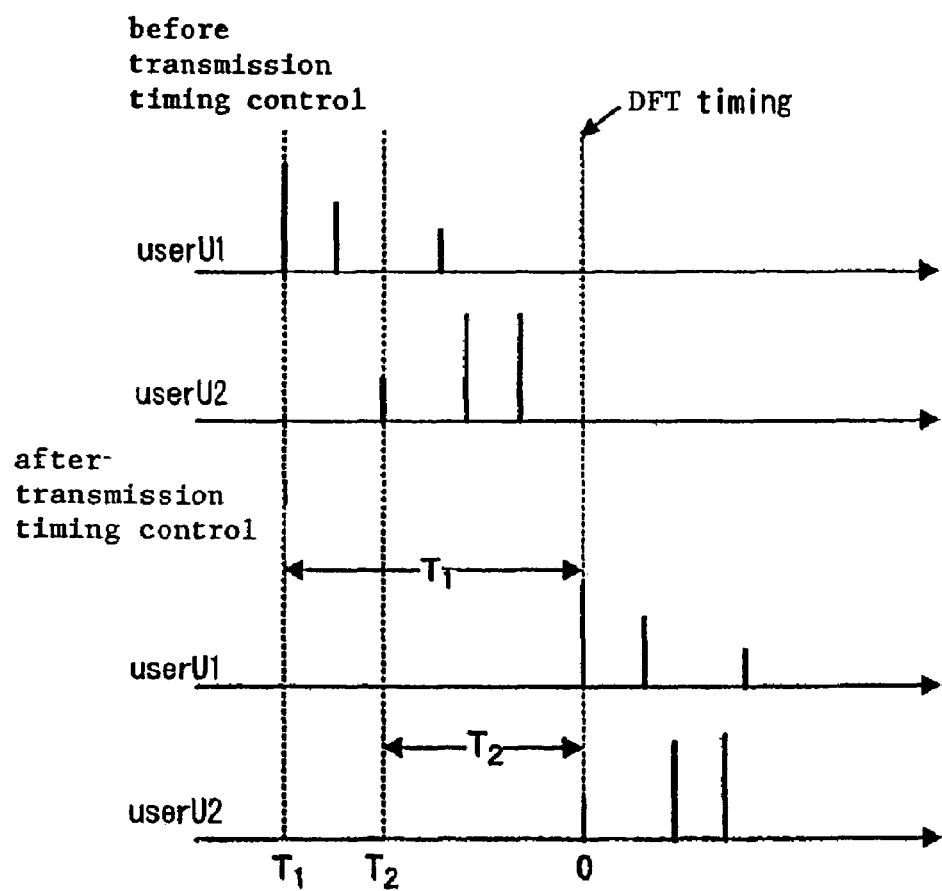
FIG. 11 is a diagram for describing the operation of transmission timing control.
Figure 12:
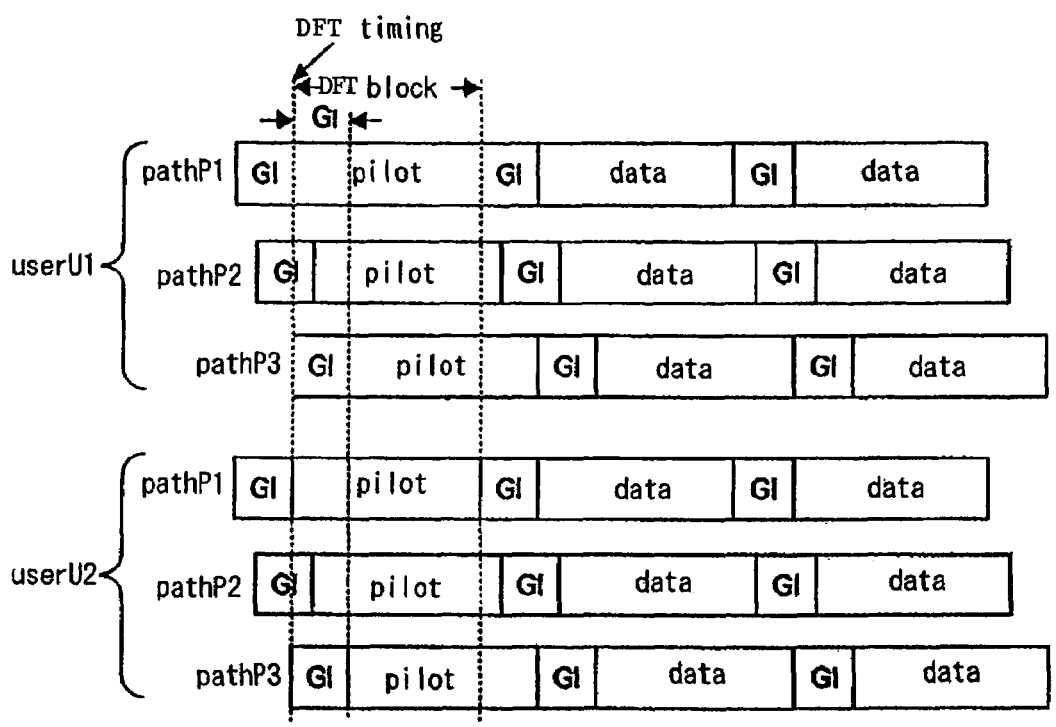
FIG. 12 is a diagram showing how received packet signals are synchronized.

Equalizing filter 12 is supplied with the received signal, the frequency band of which has been limited by reception filter 6, and is supplied with the equalization weight calculated by weight calculation unit 11 from the transmission channel estimate. Equalizing filter 12 then equalizes the received signal by multiplying the received signal by the equalization weight for each sub-carrier m in accordance with a minimum mean square error method or a zero forcing method. IDFT unit 13 receives the equalized signal in the frequency domain output from equalizing filter 12, and converts the equalized signal into a signal in the time domain through IDFT. P/S converter 14 performs a parallel to serial conversion of the equalized signal converted into a signal in the time domain to deliver a demodulated signal. On the other hand, IDFT unit 15, P/S converter 16, delay profile generator 17, and timing detector 18 detect timings using the transmission channel estimate in the frequency domain supplied from transmission channel estimator 9. IDFT unit 15 receives the transmission channel estimate in the frequency domain and converts the transmission channel estimate into an estimate in the time domain. P/S converter 16 performs a parallel to serial conversion of the transmission channel estimate represented in the time domain. Delay profile generator 17 calculates the power or amplitude of the transmission channel response sequence converted by P/S converter 16 to generate a delay profile. Timing detector 18 receives the delay profile generated by delay profile generator 17, detects from the delay profile a path with a high level, the timing of which indicates a reception timing thereof, and generates a timing control signal. Since the present invention fast Fourier transforms SC-FDMA received signals of all users commonly (using a common DFT timing), packet signal receiving timings must be synchronized to one another among the users. For this purpose, the timing signal of each user detected by demodulator 7 is fed back to a transmitter (not shown) to control the transmission timing on a user-by-user basis. FIG. 11 is a diagram for explaining the operation of the transmission timing control. User receivers 5-1, 5-2 for respective users U1, U2, detect timings $T_1$, $T_2$ of the leading paths, respectively, by timing detectors 18, and calculate timing signals $-T_1$, $-T_2$ such that timings $T_1$, $T_2$ are at zero time (DFT timing). Timing signals $-T_1$, $-T_2$ are fed back to the transmitter which then delays the transmissions by $-T_1$, $-T_2$, respectively, in transmission control. Further, in order to reduce the amount of feedback information, information indicative of advance or delay may be fed back to the transmitter as timing control signal. FIG. 12 shows how the received packet signals are synchronized after transmission timing control. The synchronization of the received packet signals of each user is performed such that the leading path coincides with the DFT timing. If the delayed paths of each user fall within GI, it is possible to avoid multi-path interference from a previous pilot or data block during the DFT processing. In the present invention, transmission timing control is required because a DFT timing common to all users is used. In conventional SC-FDMA receiving apparatuses, if sufficient guard time is not reserved between packets, the transmission timing control is also required in order to prevent packets from colliding. In this embodiment, the timing is detected using the output of transmission channel estimator 9, but alternatively, the timing may be detected using the transmission channel estimate after noise suppression, which is supplied from noise suppressor 10.

As described hereinabove, in this embodiment, SC-FDMA received signals are fast Fourier transformed for all users commonly, and demapping (frequency conversion), variable bandwidth filtering of received signals, and transmission channel estimation are all performed in the frequency domain. Therefore, an increase in the amount of processing loaded on the receiving apparatus is kept small even if the number of users is increased, as compared with a conventional receiving apparatus which performs frequency conversion, filtering of received signals, and correlation detection in the time domain. Further, since the estimation of a transmission channel and the detection of timings for each user, involved in the demodulation, are performed through signal processing in the frequency domain, multi-path interference is avoided and reception characteristics are improved.

In the present embodiment, the conversion from signals in the time domain to signals in the frequency domain is performed using DFT, and the conversion from signals in the frequency domain to signals in the time domain is performed using DFT. However, FFT (Fast Fourier Transform), IFFT (Inverse Fast Fourier Transform), or other algorithms may be used.

While a preferred embodiment of the present invention has been described using specific terms, such description is for illustrative purposes only, and it is to be understood that changes and variations may be made without departing from the spirit or scope of the following claims.

What is claimed is:

1. A multi-user receiving method in a base station with which a plurality of mobile stations each assigned to a respective user simultaneously communicate in accordance with a single-carrier frequency division multiple access scheme, said method comprising the steps of:
    converting SC-FDMA received signals of all users to signals in a frequency domain commonly;
    selecting part of the sub-carriers for each user contained in the signals in a frequency domain; and
    performing reception processing by limiting the frequency band of each user signal, to separate the user signal and to suppress noise, and by demodulating the user signal to detect a reception timing to generate a timing control signal,
    wherein said demodulating the user signal comprises:
    generating a pilot reference signal in a frequency domain of each user from pilot symbols;
    responsive to the received pilot signal, the band of which has been limited by a reception filter, and to the pilot reference signal generated by said generating step, calculating a transmission channel estimate;
    responsive to the received signal, the band of which has been limited by said reception filter, and to an equalization weight calculated from the transmission channel estimate, equalizing the received signal; and
    detecting a reception timing from a transmission channel response resulting from an IDFT of the transmission channel estimate to generate the timing control signal.

2. A multi-user receiving apparatus in a base station with which a plurality of mobile stations each assigned to a respective user simultaneously communicate in accordance with a single-carrier frequency division multiple access scheme, said apparatus comprising:
    a DFT unit for converting SC-FDMA received signals of all users to signals in a frequency domain commonly;
    a demapping unit for selecting part of the sub-carriers for each user contained in the signals in a frequency domain supplied from said DFT unit; and
    a plurality of user receivers each associated with one of a plurality of users, and each including a reception filter for limiting the frequency band of each user signal, supplied from said demapping unit, to separate the user signal and to suppress noise, and a demodulator for demodulating the output of said reception filter and for detecting a reception timing to generate a timing control signal,
    wherein said demodulator includes:
    a reference signal generator for generating a pilot reference signal in a frequency domain of each user from pilot symbols;
    a transmission channel estimator responsive to the received pilot signal, the band of which has been limited by said reception filter, and to the pilot reference signal generated by said reference signal generator, for calculating a transmission channel estimate;

an equalization processing unit responsive to the received signal, the band of which has been limited by said reception filter, and to an equalization weight calculated from the transmission channel estimate for equalizing the received signal; and a timing detector for detecting a reception timing from a transmission channel response resulting from an IDFT of the transmission channel estimate to generate a timing control signal.

3. The apparatus according to claim 2, wherein said demapping unit selects part of sub-carriers for each user from the sub-carriers supplied from said DFT unit to convert the carrier frequency of each user to zero frequency.

4. The apparatus according to claim 2, wherein said reception filter has a raised cosine roll-off characteristic with a variable bandwidth corresponding to the transmission rate of each user signal.

5. The apparatus according to claim 2, wherein said reference signal generator performs DFT on pilot symbols, limits the frequency band of the DFT signal with a transmission/reception filter, and generates a pilot reference signal by which pilot symbol pattern characteristics included in the received pilot signal, together with characteristics of the transmission/reception filter are cancelled in the calculation of a transmission channel estimate.

6. The apparatus according to claim 2, wherein said equalization processing unit equalizes the received signal in accordance with a minimum mean square error method or a zero forcing method.

7. The apparatus according to claim 2, wherein said timing detector calculates power or amplitude of a transmission channel response resulting from an IDFT of the transmission channel estimate to generate a delay profile, detects from the delay profile a path with a high level, the timing of which indicates a reception timing, and generates a timing control signal.

8. The apparatus according to claim 2, wherein said timing control signal is fed back to a mobile station and used in transmission timing control for synchronizing reception timings of packet signals among the users.

* * * * *